(12) United States Patent
Feurtey et al.

(10) Patent No.: US 10,326,764 B2
(45) Date of Patent: Jun. 18, 2019

(54) ACCESS TO A SUBSET OF INFORMATION RELATIVE TO A USER

(71) Applicant: Orange, Paris (FR)

(72) Inventors: Franck Feurtey, Versailles (FR); Joaquin Keller, Paris (FR)

(73) Assignee: Orange, Paris (FR)

( * ) Notice: Subject to any disclaimer, the term of this patent is extended or adjusted under 35 U.S.C. 154(b) by 60 days.

(21) Appl. No.: 14/781,001

(22) PCT Filed: Mar. 21, 2014

(86) PCT No.: PCT/FR2014/050661
§ 371 (c)(1),
(2) Date: Sep. 28, 2015

(87) PCT Pub. No.: WO2014/154976
PCT Pub. Date: Oct. 2, 2014

(65) Prior Publication Data
US 2016/0050206 A1      Feb. 18, 2016

(30) Foreign Application Priority Data
Mar. 29, 2013   (FR) ...................................... 13 52942

(51) Int. Cl.
*H04L 29/06*       (2006.01)
*G06Q 10/10*      (2012.01)
(Continued)

(52) U.S. Cl.
CPC ............. *H04L 63/10* (2013.01); *G06Q 10/10* (2013.01); *G06Q 50/01* (2013.01); *H04L 67/18* (2013.01)

(58) Field of Classification Search
None
See application file for complete search history.

(56) References Cited

U.S. PATENT DOCUMENTS

| 7,957,991 B2* | 6/2011 | Mikurak | G06Q 10/06 705/7.11 |
| 8,583,683 B2* | 11/2013 | Rathod | G06Q 10/00 707/770 |

(Continued)

FOREIGN PATENT DOCUMENTS

WO    WO 2012/173734 A1    12/2012

OTHER PUBLICATIONS

Notice from the European Patent Office dated Oct. 1, 2007 concerning business methods, Official Journal of the European Patent Office, vol. 30, No. 11, Nov. 1, 2007, pp. 592-593.

(Continued)

*Primary Examiner* — Jason K Gee
*Assistant Examiner* — Olanrewaju J. Bucknor
(74) *Attorney, Agent, or Firm* — Knobbe, Martens, Olson & Bear, LLP

(57) ABSTRACT

One embodiment described herein is a method comprising obtaining at least one sharing rule, each sharing rule associated with at least one subset of information and defined by at least one criterion to be verified in order to authorize making available to a consulter the associated subset of information, at least one criterion specifying at least one place of publication where the publisher—must be situated and/or at least one place of consultation where a consulter must be situated. It may include obtaining a location of the publisher user and/or a location of the consulter, identification on the basis of the location or locations obtained of at least one information subset for which all the criteria of at least one associated sharing rule are satisfied, making available—via a terminal of at least one consulter of at least one identified subset of information.

11 Claims, 3 Drawing Sheets

(51) Int. Cl.
*G06Q 50/00* (2012.01)
*H04L 29/08* (2006.01)

(56) References Cited

U.S. PATENT DOCUMENTS

| | | | | |
|---|---|---|---|---|
| 8,676,833 B2* | 3/2014 | Chunilal | ................ | G06Q 10/00 707/769 |
| 9,660,951 B1* | 5/2017 | Tunguz-Zawislak | ........................ | H04L 51/32 |
| 9,792,160 B2* | 10/2017 | Shear | .................... | G06F 9/5072 |
| 2006/0053097 A1* | 3/2006 | King | ...................... | G06F 16/951 |
| 2006/0105795 A1* | 5/2006 | Cermak | ................ | G06Q 10/10 455/518 |
| 2006/0218153 A1* | 9/2006 | Voon | ................ | G06F 17/30873 |
| 2006/0234631 A1* | 10/2006 | Dieguez | .............. | H04W 76/023 455/41.2 |
| 2007/0067271 A1* | 3/2007 | Lu | .......................... | G06Q 10/10 |
| 2008/0040151 A1* | 2/2008 | Moore | .................. | G06F 19/324 705/2 |
| 2011/0106896 A1 | 5/2011 | Baransky et al. | | |
| 2011/0196724 A1* | 8/2011 | Fenton | ............... | G06Q 20/108 705/14.16 |
| 2011/0251868 A1* | 10/2011 | Mikurak | ................ | G06Q 10/06 705/7.25 |
| 2012/0016858 A1* | 1/2012 | Rathod | ............. | G06F 17/30867 707/706 |
| 2012/0290950 A1* | 11/2012 | Rapaport | ................ | H04L 51/32 715/753 |
| 2012/0324018 A1* | 12/2012 | Metcalf | ................. | H04W 4/206 709/206 |
| 2013/0066963 A1* | 3/2013 | Odio | ...................... | G06Q 10/10 709/204 |
| 2013/0132477 A1* | 5/2013 | Bosworth | .............. | G06Q 50/01 709/204 |
| 2013/0132865 A1* | 5/2013 | Li | ........................... | H04L 51/20 715/758 |
| 2013/0325964 A1* | 12/2013 | Berberat | ................ | H04L 67/18 709/204 |
| 2013/0339358 A1* | 12/2013 | Huibers | ........... | G06F 17/30312 707/737 |
| 2014/0047045 A1* | 2/2014 | Baldwin | ............... | H04L 67/306 709/206 |
| 2014/0164365 A1* | 6/2014 | Graham | ................ | G06Q 50/01 707/723 |
| 2014/0214946 A1* | 7/2014 | van de Bruggen | ... | H04L 67/306 709/204 |

OTHER PUBLICATIONS

International Search Report dated May 9, 2014 for International Application No. PCT/FR2014/050661 filed Mar. 21, 2014.

* cited by examiner

ACCESS TO A SUBSET OF INFORMATION RELATIVE TO A USER

RELATED APPLICATIONS

This application is the U.S. National Phase of Application No. PCT/FR2014/050661 entitled "ACCESS TO A SUBSET OF INFORMATION RELATING TO A USER" filed Mar. 21, 2014, which designated the United States, and which claims the benefit of French Application No. 1352942 filed Mar. 29, 2013.

TECHNICAL FIELD

The present invention relates to the technical field of sharing information via a telecommunications network between a user said publisher and a user said consultant. More particularly, the present invention relates to a control process of an operation for providing information relative to a user.

PRIOR ART

There are several types of network services enabling users to interact with each other. In general, each of these network services allows the sharing of information chosen by the user. This information relates for example to his work, his family, his friends, his activities, his aspirations, etc. The user chooses some of this information to aggregate it in a profile.

Accordingly, there are network services for sharing profiles between different users, especially located in the same geographical zone.

For example document US2011/0106896 describes a process for sharing of information aggregated in profiles in a network and between participants at an event associated with a physical location. Each of the participants can subscribe to a social network becoming a participating subscriber and can consult the profiles of other participating subscribers via a terminal having access to the network. For example, when a participating subscriber enters the physical location associated with the event, his terminal fitted with a location module sends location information to the server of a social network. The server detects the presence of the participating subscriber with whom it associates information (for example a profile of the participating subscriber recorded in the database of the social network). The participating subscriber can consult the list of subscribers participating in the event displayed on a screen of his terminal. The participating subscriber can contact another participating subscriber or be contacted by another participating subscriber. However, a participating subscriber can define restriction criteria allowing him to restrict the sharing of his profile on the event. For example, the participating subscriber can set up a list of unwanted contacts preventing them from contacting him. He can also set up a list of friends allowing them to have access to a larger set of information on his profile.

Document WO2012/173734 describes a process for sharing of information between users of a network service letting them interact. The sharing of information is permitted inside a "bubble". A bubble is created at the request of an alpha user on his terminal to a server of the network service. A physical location corresponding to the location of the user alpha can be associated with the bubble. When another user enters the physical location, he can request the service of the network service to enter the bubble. When a large number of users enter the bubble, the physical location can be modified by enlarging and its centre shifted according to the locations of users. Each user of the bubble is identified by a profile.

These processes, even though they propose sharing of information between different users, are limited to the sharing of a set of information by user aggregated in a profile. As a consequence, a publisher user will always share the same profile, irrespective of the circumstances and the identity of the consultant users.

This is not preferable for at least the following reasons. On the one hand, the shared information can be pertinent or not for the consultant user who receives it. There are in fact no means for adaptation of information shared as a function of the receiving user of this information. On the other hand, the user who provides information on himself can neither correctly manage the confidentiality of some of this information, nor ensure that information containing a certain degree of confidentiality will not be widely disclosed but only to those authorised.

The inventors have noticed that it would be interesting for a publisher user to be able to differentiate the information he is sharing with others, and control the provision of this information efficaciously and simply.

PRESENTATION

An aim of the present invention is to eliminate at least one disadvantage of the prior art presented hereinabove.

A control process of a provision operation is proposed, via a telecommunications network, of at least one user, said consultant, of at least one subset of a set of information available on a user, said publisher, the process being executed by a server and comprising the following steps:
  obtaining of at least one rule, referred to as sharing rule, each said sharing rule being associated with at least one said information subset and defined by at least one criterion to be verified to enable a provision of a consultant user of the associated information subset, said at least one criterion specifying at least one location of publication where the publisher user must be and/or at least one location of consultation where a consultant user must be;
  obtaining a location of the publisher user and/or a location of the consultant user;
  identification from the location(s) obtained of at least one information subset for which all criteria of at least one sharing rule associated are verified,
  provision via a terminal of at least one consultant user of at least one identified information subset.

This set of information is for example constituted by a set of information comprised in one or more profiles constituted for this user relative to one or more services of one or more networks, especially relative to one or more services of one or more social networks.

All the information available on a user can comprise for example information on a particular aspect or particular aspects of the life of the publisher user, whether this is private, professional, communal, etc. One or more subsets can be defined in this set of information on a user, each corresponding to a facet of this user.

A facet is defined as a subset of a set of information relative to the user. This term "facet" will be repeated throughout the present description for clarity.

The control process enables a publisher user to share one or more facets with one or more consultant users.

Sharing a facet with a consultant user here means a provision operation of this consultant user of the information subset corresponding to this facet.

The provision operation comprises especially sending access data allowing access by the consultant user to an information subset previously identified. Access data allowing access to facets mean either information on facets directly, or data which will procure them (for example, sent a request to procure them) or consult them (for example, by means of a link of URL access type).

This provision operation is for example sending of information, or sending a link for access to this information, or even sending a notification from which the consultant user will be able to request and obtain access to this information. This operation therefore makes the identified information subset accessible to a consultant user. Finally, irrespective of the operation, the aim is for the consultant user to be able to consult, if he wants, the information of the facet.

A major advantage of the control process is to allow a publisher user to automate by means of rules the sharing of one or more facets defined relative to a set of information available on this user, conditionally on his own location and/or that of at least one other consultant user likely to consult the shared facet(s).

In particular, according to the sharing rules which will be defined for the different facets, the facet selected at a given instant to be shared with a consultant user could be different according to the location where the publisher user is at this instant and/or the location where the consultant user is.

The pertinence of sharing of the facet is controlled such at least via current respective locations of the publisher user and of the consultant user.

Also, the publisher user keeps control of the nature of information made available and on the potential consultant users to whom this information will be sent. The publisher user can choose not to communicate some of his information available on himself, and to certain people only, to keep the rest confidential. He therefore controls the degree of confidentiality of the different subsets of information available on himself.

The sharing rules therefore serve as rules for access control to information available on the publisher user. In particular, each of the rules specifies the verification(s) to be done on the location of the publisher user and/or that of the consultant user relatively respectively to a location of publication and/or a location of consultation before authorising access to an information subset given associated with this rule. In this document, the terms for sharing rules, access rules or access control rules will be used variously to designate all these rules.

Due to these rules and the location information on which they are based, the publisher user can differentiate the information he is sharing with others, especially as a function of the locations, moments and/or potential consultant users.

Such a method for sharing of facets is interesting in different situations. For example, with a first configuration of access rules including both a criterion on the location of the publisher user and a criterion on the location of the consultant user, a facet which comprises information on the professional competencies and/or the professional background of the publisher user will be shared, that is, provision of the consultant user, only if the publisher user and the consultant user are both at a trade fair resembling companies proposing offers of work and the potential candidate users to these offers of work.

According to another example, with another configuration of the access rule of this facet, including only one criterion on the location of the consultant user, this same facet could be shared with a consultant user as soon as this consultant user is at the trade fair, and even if the publisher user is currently not there.

According to the invention, the sharing system selects from the plurality of facets defined for the publisher user that or those he wants to make accessible when he is in a set location and/or when the potential consultant user(s) are in a set location. Therefore, when the publisher user moves to leave a first location and goes to a second location, without the need for intervention of the publisher user, the sharing system selects those facets not to be made accessible any longer and those facets to be made accessible.

Advantageously, but optionally, the process according to the invention can further comprise at least one of the following characteristics:
- at least one said criterion is input by means of a code comprising pre-recorded indications for parameterising this criterion. This can enable automated input of an access rule common to several publisher users, for example in the case of a particular event such as trade fair, conference, exhibition, festive event, etc;
- said at least one criterion of an access rule specifies at least one timeslot outside which or during which access to the subset of said set of information relative to the publisher user is prohibited. This has for example access to the facet depend on a particular event or the rhythm of life of the publisher user;
- It further comprises a step for provision of the consultant user of information on the location where the publisher user is and/or provision of the publisher user of information on the location where the consultant user is, who could organise direct meetings between the consultant user and the publisher user;
- said at least one criterion specifies a condition on information on the consultant user to be verified to enable provision of the consultant user of the associated information subset, the process comprising an identification step of the consultant user(s) verifying said condition, the identified subset being made available solely for the identified consultant user(s). This embodiment for example defines, at least implicitly, via the condition to be respected on the consultant user, lists of users with whom sharing a facet is authorised and/or lists of users with whom sharing a facet is prohibited;
- the information on the consultant user is a link existing between the publisher user and the consultant user, maintaining a high level of security for the publisher user;
- all the information available on the publisher user comprises information of at least one profile of the publisher user defined relative to at least one service of at least one social network. This aspect lets a publisher user benefit from profiles already created on social networks;
- the identification step of an information subset is further conducted as a function of a criterion on the type of location of publication where the publisher user is located and/or of the type of location of consultation where the consultant user is located. So for example, different facets could be consulted according to whether the publisher user is in a professional or private environment. More generally, access to facets can be conditioned to a context associated with the publisher user and/or with the consultant user.

It further comprises a sending step to a terminal of the consultant user and/or of the publisher user of notification on the provision of the identified information subset. This aspect can for example allow a consultant user to be able to more quickly access a facet of the publisher user.

It further comprises a receiving step from a terminal of a consultant user of an access request to the identified information subset and, if needed, a redirection step following said access request, from the terminal of the consultant user to a consultation address of the identified information subset. This limits the quantity of information stored by the sharing server.

It also comprises a sending step of the identified information subset to a terminal of the consultant user, allowing the user to consult said information.

The invention further proposes a computer program comprising instructions for execution of the steps of the process described hereinabove, when the program is executed by a processor.

According to a second aspect the invention relates to a control server of a provision operation, via a telecommunications network, of at least one user, said consultant, of at least one subset of a set of information available on a user, said publisher, the server comprising:
- a module for obtaining at least one rule, referred to as sharing rule, each said sharing rule being associated with at least one said information subset and defined by at least one criterion to be verified to enable provision of a consultant user of the associated information subset, said at least one criterion specifying at least one location of publication where the publisher user must be and/or at least one location of consultation where a consultant user must be;
- a module for obtaining a location of the publisher user and/or a location of the consultant user;
- an identification module from the location(s) obtained of at least one information subset for which all the criteria of at least one associated sharing rule are verified,
- a provision module via a terminal of at least one consultant user of at least one identified information subset.

The server comprises a data-processing unit configured to perform the steps of the control process described hereinabove in its different embodiments.

According to a third aspect, the invention relates to a terminal for executing a control process of a provision operation, via a telecommunications network, of at least one user, said consultant, of at least one subset of a set of information available on a user, said publisher, the terminal comprising a communications module adapted to send, to a server for executing said process, at least one rule, referred to as sharing rule, said sharing rule being associated with at least one said information subset and defined by at least one criterion to be verified by said server to enable provision of a consultant user of the associated information subset, said at least one criterion specifying at least one location of publication where the publisher user must be and/or at least one location of consultation where a consultant user must be.

In an embodiment, the terminal comprises an input module of definition data of a said sharing rule and definition data of an information subset.

In an embodiment, the terminal further sends a transmission module to said server of a location of said terminal as location of the publisher user.

According to a fourth aspect of the invention, a system comprising a terminal according to the third aspect of the invention is proposed, as is a control server according to the second aspect of the invention in keeping with the above description.

DRAWINGS

Other aims, characteristics and advantages will emerge from the following description in reference to the drawings given by way of illustration and non-limiting, in which:

FIG. 1 schematically illustrates a sharing system of a shareable facet of a plurality of facets of a user;

DESCRIPTION

Figure 1:
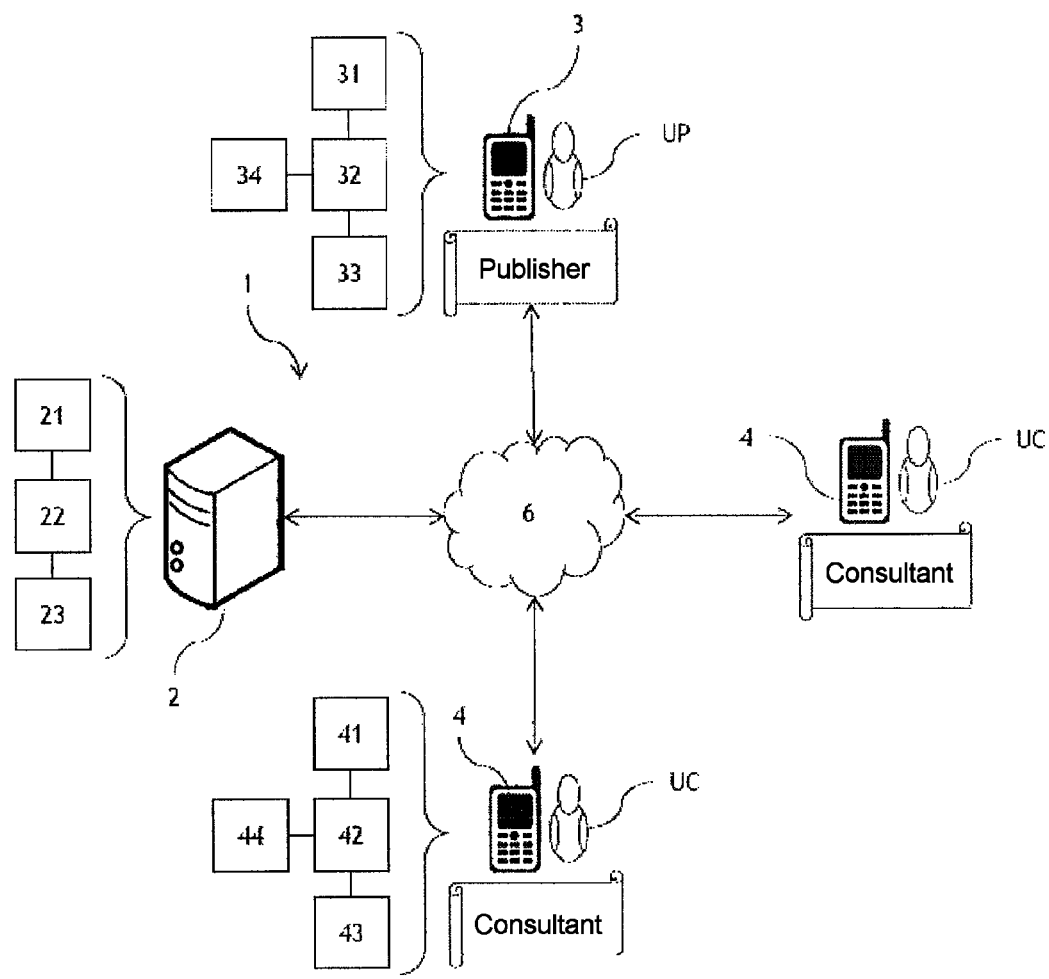
Figure 2:
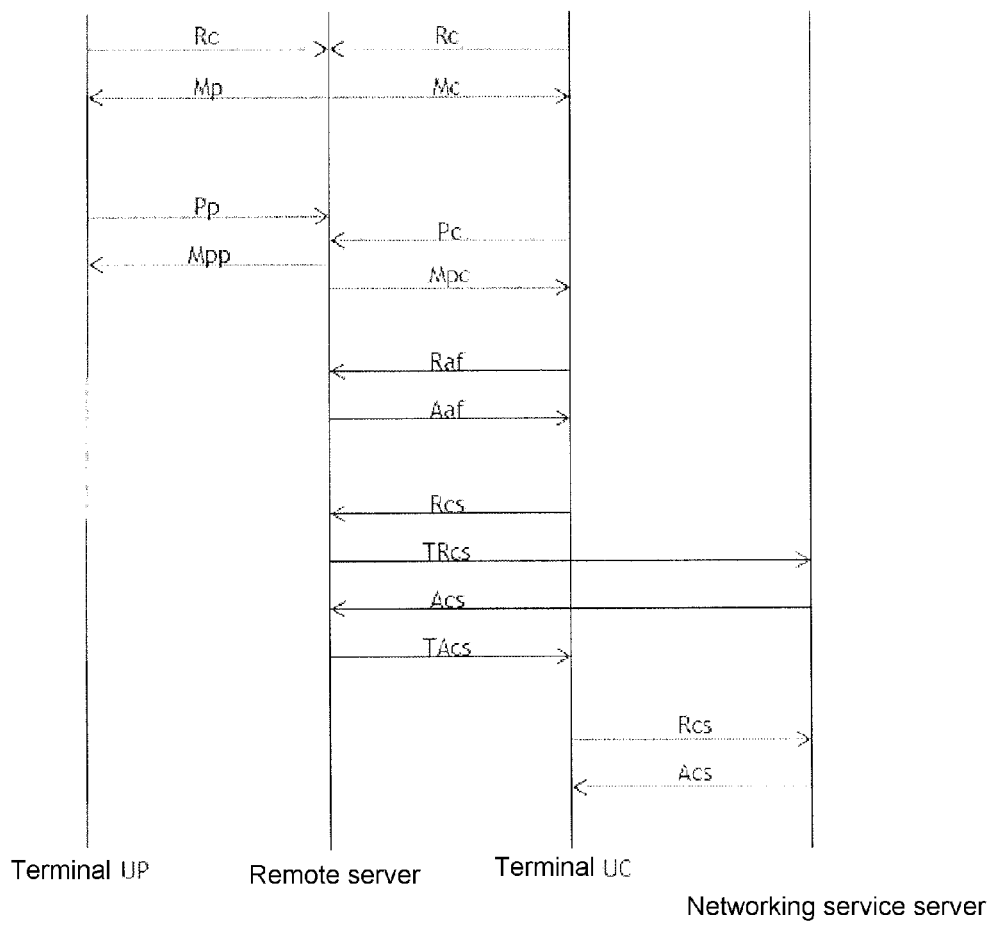
FIG. 2 is a diagram schematically illustrating the interactions between a control server, two terminals and a server of a network service.
Figure 3:
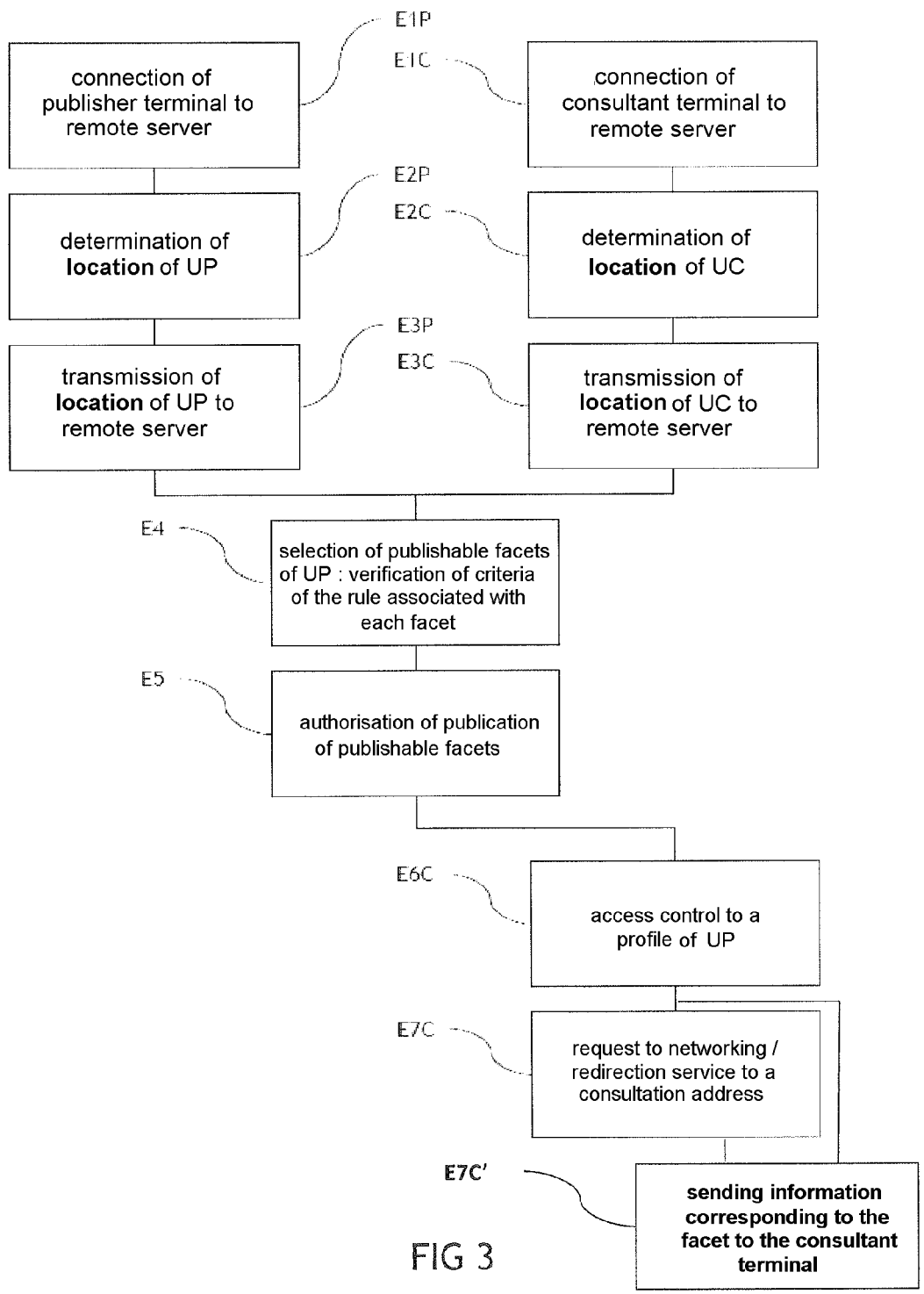
FIG. 3 is a diagram illustrating the main steps of a control process for provision of a shareable facet of a plurality of facets of a user.

A control process of a provision operation of an information subset relative to a user is described hereinbelow in reference to FIGS. 1 to 3. This provision operation (also called sharing) is performed by a control system designed for controlling the operations for provision of information, also called sharing system. The aim of these provision operations is sharing of information between a user said publisher and a user said consultant.

The sharing system 1 comprises both part a server for control of operations for provision of information, abbreviated to sharing server or control server 2, this server advantageously being a remote server, and also at least two terminals 3, 4 communicating with this server.

The sharing server 2 comprises communication modules 21 with the terminals (for example of client/server request type), a data-processing unit 22 (for example a processor) running one or more computers and associated computer programs 22. This computer program 22 comprises instructions for execution of the steps of the control process involving the server, when the program is executed by the data-processing unit 22. The exchanges between the terminals 3, 4 by means of the sharing server 2 reduce the necessary processing resources in each terminal 3, 4, and secure the exchanges. This computer program 22 can be stored on a recording medium.

The sharing server 2 can also comprise a database 23 for storing the information necessary for the process as will be described hereinbelow, for example the access rules.

This sharing server 2 is dedicated, in all or in part, to managing the control process.

Exchanges between the terminals 3, 4 and the sharing server 2 are carried out via a communications system 6.

The communications system 6 is for example a system for communication by mobile telephony, or an Internet network, or the like. As per the nature of the transmission, the communications module comprises relay antennas, servers and other classic transmission means.

Each terminal 3, 4 comprises an interaction interface with a user for inputting information and a display for displaying information.

The terminal 3, 4 also comprises a communications module 31, 41 and is configured to transmit requests and data to the sharing server.

The communications module 31, 41 is classic, and depends on the type of communication used (network, Bluetooth, Internet, etc.).

The terminal 3, 4 comprises at least one processing unit 32 (for example of processor type) for managing the different applications and processing executed by the terminal.

The terminal also comprises at least one memory.

For executing the control process, the terminal 3, 4 comprises at least one application 33, 43. This application 33, 43 is a computer program comprising instructions for execution of the steps of the control process involving the terminal, when the program is executed by a processor, such as the processing unit 32, 42. The application 33, 43 can be stored in the memory. The computer program can be stored on a recording medium (memory, CD, key, etc.) legible by a processor, or can be downloaded via the communications module.

The terminal 3, 4 is for example a mobile telephony terminal, such as a "Smartphone", but it can be any other adapted mobile communication terminal (such as laptop, tablet, etc.).

The control process is executed by the application 33, 43 of the terminal of the user which can be dedicated to the latter and via the sharing server 2 and comprises a connection step E1P, E1C of the terminal 3, 4 of the user UP, UC to the sharing server 2 via the communications system 6. When the user UP, UC executes the dedicated application 33, 43 on his terminal 3, 4 a connection request Rc to the sharing server 2 is sent to the latter via the communications module 31, 41 after command by the application 33, 43 via the processing unit 32, 42. A confirmation message Mp, Mc is sent by the sharing server 2 to the terminal 3, 4 indicating to the application 33, 43 that the terminal 3, 4 is connected.

The term "publisher" is relative to a user UP who wants to make information on himself accessible. The term "consultant" is relative to a user UC who wants access the information on the publisher user.

Therefore, a terminal will be called publisher terminal 3 if it is that of the publisher user UP, consultant terminal 4 if it is that of the consultant user UC.

In general, all users are both publisher users and consultant users. Therefore, for the needs of the description only the singular is employed and must be understood as including both singular and plural.

The information available on a publisher user are associated with one or more facets. The facets of the publisher user UP are supposedly different in twos. For example, when two facets are considered, at least one information subset differs between the two facets and/or information can be present in one facet but absent in the other facet.

The information available on a publisher user is selected for example from the group comprising:
  information relative to the physique or the identity of the publisher user,
  information relative to the professional activity of the publisher user,
  information relative to the links between the consultant user of other users,
  information relative to the participation of the publisher user to an event,
  information relative to the activities, tastes or hobbies of the publisher user.

The set of all information available for example comprises a set of information contained in one or more profiles defined for this user relative to one or more services, whether these are services of one or more networks, especially of one or more social networks.

One facet of a publisher user can for example correspond to a profile of this publisher user, the information of this profile being stored in a database of an online social network service: for example Facebook®, Twitter®, YouTube®, Instagram®, LinkedIn®, Viadeo®, Couchsurfing®, Meetic® etc.

One facet of a publisher user can also be an aggregation of information present in different profiles of this publisher user: either different profiles constituted for the same service and the same network, or different profiles constituted respectively for different services of the same network and/or different networks.

An ad-hoc profile can also be created for the needs specific to the process, independently of a profile existing for a service existing in a network. A facet of a publisher user could correspond to this ad-hoc profile.

One facet corresponds for example to an aspect of the life of the publisher user UP. One facet can be associated with his professional life and comprise only information on himself which he wants to share in a professional context, for example his training, his professional career, his activity, the company for which he works, his clients, his suppliers, etc. This information can be aggregated in profiles stored in the professional network service databases such as LinkedIn® and Viadeo®.

One facet can be associated with his private life and comprise only information on himself which he wants to share outside the professional sphere, for example information on his physique, his age, his sports activities, his cultural activities, his past-times, his friends, etc. This information can be aggregated in profiles stored in more general network service databases such as Facebook®, Twitter®, or more specialised such as Instagram® or Meetic®.

One facet can be associated with his travel activities and comprise only information on himself which he wants to share when travelling, for example his past trips, his travel plans, his itinerary with steps and dates, his searches for accommodation such as hotels, inns, stays, bed-and-breakfasts, his searches for eating locations such as restaurants, bars, inns, hotels, takeaways, markets, his opinions on this accommodation or eating locations, etc. This information can be aggregated in profiles stored in network service databases for travellers, such as Couchsurfing®.

The examples given in the paragraph above are given only by way of illustration and can in no way be interpreted as any limitation of the process. Therefore, other types of facets are possible and limited only by the choice of the user. Also, the publisher user can easily decide to include information relative to his private life in his professional facets or associated with his travel activities, etc.

Each access rule is associated with a facet. More precisely, each access rule is associated with a subset of said set of information relative to the publisher user. The access rule defined for a facet specifies under what conditions the facet can be shared between the publisher user UP and the consultant user UC. For this, the access rule is defined for example by one of the two following criteria:
  a location of publication where the publisher user UP must be able to access the facet;
  a location of consultation where the consultant user UC must be able to access the facet with this consultant user.

Each of the locations of publication and consultation can be a geographic zone more or less extended, continuous or discontinuous. Any method of definition of geographic zone is possible here.

Another criterion which can feature in the access rule is a timeslot outside, or during which, access to the facet is blocked. The timeslot can be a timeslot in a day (determined or not) or a timeslot overlapping at least two days.

In an embodiment, another criterion which can define the access rule is a condition to be verified on information on the consultant user to enable sharing of the relevant facet. In this embodiment, information on the consultant user is for example: an indication on the physical of the consultant user UC, an indication on the professional activity of the consultant user UC, an indication on the links between the consultant user UC and the publisher user UP (for example if indicated as friends on a network service), an indication on the participation of the consultant user UC in an event.

In this embodiment, access to the relevant facet will be permitted only to an identified consultant user or consultant users.

This embodiment for example defines, at least implicitly, via the condition to be respected on the consultant user lists of users with whom sharing a facet is authorised and/or lists of users with whom sharing a facet is prohibited.

For example, the condition to be verified will comprise a list of identifiers of consultant users authorised or not to access the facet.

In another embodiment, the access rule can be defined by a criterion on the type of location of publication where the publisher user is located and/or of the type of location of consultation where the consultant user is located. For example, a publisher user could authorise access to a facet comprising information on the professional activities of this publisher user only if the location in which the publisher and/or consultant user is a location of "professional" character: professional trade fair, workplace, etc. On the contrary, a publisher user could authorise sharing a facet comprising information on his private life only if the location in which the publisher and/or consultant user is a location with "private" or "non-professional character": pool, cinema, fun park, etc. Classification of a few locations frequented by the user could previously be defined to be able to manage this type of condition.

More generally, an access rule can be defined by a criterion on the location of publication where the publisher user is located and/or the location of consultation where the consultant user is located. Any property, characteristic or information on a location of publication and/or consultation can be used for this purpose.

When the different criteria presented hereinabove are useable individually or according to any combination for definition of an access rule.

A facet is created by the publisher user UP who determines the criteria of the rule he wants associated with the facet. The creation is preferably done on the publisher terminal 3, but is not limited to being performed on this publisher terminal 3 and can be performed on another terminal having means of access to the network but not necessarily mobile.

During creation of the facet, the publisher user UP determines the information to be aggregated via the terminal used, as well as the criteria of the rule associated with the facet to be created. The facet created is recorded either on the publisher terminal 3, optionally by the means of the sharing server 2, or in the database 23 of the sharing server 2. The data defining the rule and those identifying the information subset constituting the associated facet are transmitted via the terminal of the publisher user to the sharing server 2.

The aggregation of information can be done by input of written information. The aggregation of information can also be done by uploading of visual information (optionally animated) and/or audio. The aggregation of information can again be done, when the facet comprises a profile, by association of the profile with the facet, in which case the facet comprises instructions for access to the server of the corresponding network service or for sending to a consultation address of the profile.

The criteria can be determined by the publisher user UP during a step for input of criteria. For this, a set of criteria can be presented to the publisher user UP which he chooses or not to use and optionally complete. For example, for the location of publication and the location of consultation the publisher user UP inputs an indication of location on his terminal. The input can be done either by selection of a point or a zone on a map displayed on a display of the terminal or by entry of the name of a location or an address. As a variant, the criteria used most by the other publisher users UP which are in the same location can be made more visible to the publisher user UP to recommend these criteria. In another variant, the criteria preciously used by the publisher user UP can be made more visible to the latter. In general the solutions illustrative of these variants can be combined.

At least some of the criteria can be determined by a step for inputting a code comprising indications pre-recorded by the means of the publisher terminal 3. This code is advantageous for example in the case of a particular event, such as trade fair, conference, exhibition, festive event, etc, as it can serve as automated input mode of an access rule common to several publisher users. In this case, the organisation of the event can send a code comprising for example indications on the publication and consultation locations, as well as the timeslot. The code can naturally comprise other indications corresponding to other criteria. Therefore, the publisher user UP will not need to detail each criterion, and will have to only input a single code for several criteria to be parameterised in the access rule.

The control process comprises a determination step E2P of a location Pp of the publisher user UP, and a determination step E2C of a location Pc of the consultant user UC.

The location Pp, Pc can be the physical point where the user UP, UC is. The location Pp, Pc can be defined for example by points of coordinates, or defined relative to a signal transmitter such as a Wifi terminal. The location Pp, Pc can be also a physical zone where the user UP, UC is, when for evident reasons of private life and discretion it is chosen so as not to reveal the exact location of the user, that is, the location of the user is determined as at more or less one or even several meters nearby.

The determination E2P, E2C of the location of the publisher user, or of the consultant user, can be done by triangulation using a location module 34, 44 of the publisher terminal 3, respectively of the consultant terminal 4, such as a GPS module. In this case, determination E2P, E2C of the location of the user can be triggered by execution of the application 33, 43 dedicated by the user which controls the location module 34, 44 via the processing unit 32, 42. Any other location method can be used, however.

The location module 34, 44 then sends the location Pp to the processing unit 32, 42 which transmits it to the application 33, 43.

The determination E2P, E2C of the location of the user can also be triggered at a regular time interval and automatically by the dedicated application 33, 43. The determination E2P, E2C of the location of the user can again be triggered intentionally by the user by activating a function of the application 33, 43 via an interface which can be the display of the terminal, a keypad of the terminal, a micro of the terminal, etc. This function can be a function of location controlling only the location of the user. This function can again be a function for displaying of facets, activated especially by the consultant user, controlling the display on the display of the terminal, especially the consultant terminal, of a list of facets.

In the event where the location module is integrated into or associated with the terminal of the user, the location of the publisher user (respectively of the consultant user) is that of a terminal of the publisher user (respectively of the consultant user). The terminal of the publisher user (respectively of the consultant user) comprises in this case a transmission module to the control server of location information of this terminal as location of the publisher user (respectively of the consultant user).

It should be noted however that the terminal used for the location of the publisher user (respectively of the consultant user) can be different to that used during provision of a facet or definition of an access rule.

As an alternative, the location of the publisher user (respectively of the consultant user) can also result from a declaration made by the publisher user (respectively the consultant user): in which case the location of the user does not necessarily correspond to the location of the corresponding terminal.

The determination E2P, E2C of the location Pp, Pc of the publisher user UP, or of the consultant user UC, can be carried out directly by the latter, for example by inputting an indication of location by the publisher user UP or consultant UC on his publisher terminal 3, respectively his consultant terminal 4. The input can be done either by selection of a point or a zone on a map displayed on a display of the publisher terminal 3, respectively consultant 4, or by entry of the name of a location or an address.

The process also comprises the transmission E3P, E3C of the location Pp, Pc of the publisher user UP and of that of the consultant user UC to the sharing server 2. The location Pp, Pc is for example transmitted via the communications module 31, 41 of the terminal 3, 4 of the user UP, UC after command by the processing unit 32, 43 which has received the location Pp, Pc of the location module 34, 44. Transmission is done via the communications system 6.

The sharing server 2 records the location Pp, Pc of the corresponding user UP, UC in his database 23 and can optionally send a receipt confirmation message Mpp, Mpc.

The process also comprises an identification and selection step E4 by the sharing server 2 of sharable facets of the plurality of facets of the publisher user UP, that is, facets for which all the criteria of an access rule associated are fulfilled. For example, when the consultant user UC activates a function for displaying facets by means of the application 33, 43, a display request Raf is sent to the sharing server 2 via the communications module 31, 41 after command via the processing unit 32, 42. To carry out identification, the sharing server 2 compares for example, for each facet, the criteria of the sharing rule associated with the facet to the information which the sharing server 2 has on the consultant user, for example by accessing the information contained in the profiles of the stored facet either in the database 23 of the sharing server 2, or in the databases of a social network service if needed. In particular, for the location of publication, the sharing server 2 determines if the location Pp of the publisher user UP corresponds to the location of publication. If such is the case then this criterion is satisfied. If not, the criterion is not satisfied and the sharing of the corresponding facet is blocked: no access to the subset associated with the access rule is given. For the location of consultation, the sharing server 2 similarly performs with the location Pc of the consultant user UC.

When the access rule associated with a facet comprises a criterion on the consultant user, whether this is a criterion on the location where the consultant user is or a condition on information on this consultant user, the sharing server executes an identification step of the consultant user(s) verifying this criterion, the facet identified during step E4 being provision only of the identified consultant user(s).

The process also comprises an authorisation step E5 for access to the sharable facets (i.e. of authorised access) by the sharing server 2. Therefore, the sharing server 2 authorises the sharing of the sharable facet(s) of the publisher user with one or more consultants and sends to the consultant terminal 4, or even to the publisher terminal, via the communications system 6 a notification of provision Aaf of the sharable facet(s). The communications module 41 of the consultant terminal then receives the notification and transmits it to the application 43 via the processing unit 42 of the consultant terminal 4.

The facets are presented for example in the form of a list on the display of the consultant terminal 4.

The consultant user UC can select a sharable facet to request access E6C to the information subset corresponding to this facet. The selection of such a facet triggers for example sending, to the sharing server, by the consultant terminal, of an access request to the corresponding information subset.

In the event where the content of the facet comprises a profile recorded in the database of a social network service, the profile can be viewed, optionally on command E6C of the consultant user UC on his consultant terminal 4, following a step E7C for sending an access request TRac to the profile by the sharing server 2 to the server of the social network service, or following a redirection step of the consultant terminal to a consultation address of the profile.

For example, when the consultant user UC commands on his consultant terminal 4 the display of the profile via the application 43, the processing unit 42 commands the communications module 41 to send a consultation request Rcs to the sharing server 2 via the communications system 6. The sharing server 2 then sends the request TRcs via the communications system 6 to the server of the corresponding network service which in return sends a consultation authorisation Acs to the sharing server 2 which transmits the consultation authorisation Tacs to the consultant terminal 4. The consultation authorisation can be partial authorisation subject to the consultation rules of the network service. The consultation authorisation of the profile can also be full authorisation, for example when the network service collaborates with the service for sharing facets.

As a variant, the consultant terminal 4 directly sends the consultation request Rcs to the server of the network service without going via the sharing server 2. In this case, the server of the network service sends the consultation authorisation Acs directly to the consultant terminal 4. Here too the consultation authorisation can be partial and subject to the consultation rules of the network service or total.

According to another variant, the information subset corresponding to each sharable facet selected is sent E8C to the consultant terminal by the sharing server or another server. In a particular case, the provision notification Aaf of the sharable facet(s) comprises the information subset corresponding to each selected sharable facet. The consultant user then has immediate access to this information, without an access request to a server having to be sent. The information subset can be displayed automatically as soon as the provision notification is received, or only on demand of the user.

The consultant user UC can also apply a filter to the list of sharable facets. Therefore, the consultant user UC can select from the publisher users 3 those he wants to see displayed on his consultant terminal 4. The filter can relate to the same indications as the criteria described earlier.

According to an embodiment, during step E5 a provision step is provided of the consultant user of information on the location where the publisher user is whereof the facet has been identified and to which access is authorised and/or a provision step of the publisher user of information on the location where the consultant user is to which the selected facet has been provided.

The provision method of this information on the location can be identical to any of the methods described hereinabove for provision of information of the selected facet:
either by sending to the consultant terminal/publisher terminal information via the sharing server or another server, for example in the provision notification of the facet,
or on access request sent by the consultant terminal, with or without redirection.

For executing a control process of a provision operation, the terminals 3, 4 are equipped with all or some of the following software and/or hardware modules:
input modules for inputting definition data of an access rule or definition data of an information subset constituting a facet;
location module for determining location of the terminal, serving as location of the user of this terminal;
communications module with the sharing server 2, for sending data/messages to the sharing server 2 or receiving data/messages from this sharing server 2; these data are especially data input by means of the input module (rules, facets) and/or location data of the terminal obtained by means of the location module and/or location data of another terminal and/or access data to facets and/or an information subset corresponding to a facet.

The term "module" in this document corresponds to a software component, to a component materiel or else to a set of hardware and/or software components capable of performing a function or a set of functions, according to this which is described hereinabove for the relevant module.

The different embodiments described in this document can be combined together to carry out the invention.

The invention claimed is:

1. A method for managing provision to a consultant user of sets of information relating to publisher users, the method comprising:
providing a set of information of a publisher user comprising several information subsets of the publisher user, each subset of the publisher user being associated with an access rule to the subset of the publisher user, the access rule being defined by at least one criterion to be verified to allow access to the subset of the publisher user to a consultant user, the at least one criterion refers to a location and timeslot criterion, specifying at least one of the location and timeslot of publication where the publisher user must be and at least one location and timeslot of consultation where a consultant user must be, wherein the method being executed by a server and comprising for each publisher user whose set of information is managed by the server;
obtaining, by the server, at least one of the location and a timeslot of the publisher user and the location and timeslot of the consultant user;
determining, by the server, among the subsets of information of the publisher user, whether all the criteria of the access rule associated with at least one information subset of the set of information relating to the publisher user are verified and for which subsets of information of the publisher user, the verification of the location and timeslot criterion being performed by determining at least one of whether the location and timeslot of the publisher user corresponds to the location and timeslot of publication and the location and timeslot of the consultant user corresponds to the consultation location and timeslot, the determined subset being a sharable subset by the consultant user; and
sending, by the server, to the consultant terminal device a notification of provision of the sharable subset relating to the publisher.

2. The method according to claim 1, wherein the at least one criterion is input via a code comprising pre-recorded indications to parameterize this criterion.

3. The method according to claim 1, wherein the at least one criterion specifies at least one timeslot outside which or during which access to the subset is prohibited.

4. The method according to claim 1, comprising providing the consultant user information on the location where the publisher user is and/or providing the publisher information on the location where the consultant user is.

5. The method according to claim 1, wherein the at least one criterion specifies a condition on information on the consultant user to be verified to enable provision of the consultant user of the associated information subset, the process comprising an identification step of the consultant user(s) verifying the condition, the subset identified being made available solely for the identified or consultant user(s).

6. The method according to claim 1, wherein the selection of an information subset is further performed as a function of a criterion on the type of location of publication where the publisher user is located and/or of the type of location of consultation where the consultant user is located.

7. The method according to claim 1, further comprising sending to a terminal of the consultant user and/or of the publisher user of notification on the provision of the identified information subset.

8. The method according to claim 1, further comprising receiving from a terminal of a consultant user of a request for access to the identified information subset.

9. The method according to claim 8, further comprising redirection, following an access request, from the terminal of the consultant user to a consultation address of the identified information subset.

10. The method according to claim 1, further comprising sending of the identified information subset to a terminal of the consultant user.

11. The method according to claim 1, wherein the information of the set of information is comprised in several profiles constituted for the publisher user relative to several services of social networks.

* * * * *